(12) United States Patent
Goda et al.

(10) Patent No.: US 7,946,636 B2
(45) Date of Patent: May 24, 2011

(54) VEHICLE FRONT SHOCK ABSORBING STRUCTURE

(75) Inventors: Naoki Goda, Kariya (JP); Naoki Suzuki, Kariya (JP)

(73) Assignees: Toyota Shatai Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/445,051

(22) PCT Filed: Oct. 2, 2007

(86) PCT No.: PCT/JP2007/069273
§ 371 (c)(1),
(2), (4) Date: Dec. 2, 2009

(87) PCT Pub. No.: WO2008/044543
PCT Pub. Date: Apr. 17, 2008

(65) Prior Publication Data
US 2010/0102581 A1    Apr. 29, 2010

(30) Foreign Application Priority Data

Oct. 12, 2006  (JP) ................. 2006-278575

(51) Int. Cl.
*B60R 19/22* (2006.01)
(52) U.S. Cl. ........................ 293/120; 293/102
(58) Field of Classification Search .............. 296/102, 296/120
See application file for complete search history.

(56) References Cited

U.S. PATENT DOCUMENTS

| | | | |
|---|---|---|---|
| 6,179,355 B1 * | 1/2001 | Chou et al. | 293/132 |
| 6,983,964 B2 * | 1/2006 | Murata et al. | 293/109 |
| 7,226,097 B2 * | 6/2007 | Adachi et al. | 293/120 |
| 2004/0056491 A1 * | 3/2004 | Murata et al. | 293/120 |
| 2006/0028037 A1 | 2/2006 | Kashiwagi et al. | |
| 2006/0131899 A1 | 6/2006 | Adachi et al. | |

FOREIGN PATENT DOCUMENTS

| | | |
|---|---|---|
| EP | 1 564 079 A1 | 8/2005 |
| JP | 63-8046 | 1/1988 |
| JP | 2004-175338 | 6/2004 |
| JP | 2004-224106 | 8/2004 |
| JP | 2006-044504 | 2/2006 |

* cited by examiner

*Primary Examiner* — Joseph D Pape
(74) *Attorney, Agent, or Firm* — Patterson Thuente Christensen Pedersen, P.A.

(57) ABSTRACT

A front shock absorbing structure of a vehicle includes a bumper reinforcement member that is disposed in a vehicle width direction in a front portion of a vehicle body and is formed as a rigid elongated member, and a shock absorbing member that is positioned on a front surface of the bumper reinforcement member. The shock absorbing member is vertically divided into a first shock absorbing portion and a second shock absorbing portion. The first and second shock absorbing portions are integrally coupled to each other at a forward side, so as to define a space therebetween at a rearward side. The coupling can be broken when an impact is applied by an impactor from ahead. The second shock absorbing portion has a protruding portion that is projected toward the space.

2 Claims, 5 Drawing Sheets

VEHICLE FRONT SHOCK ABSORBING STRUCTURE

PRIORITY CLAIM

The present application is a National Phase entry of PCT Application No. PCT/JP2007/069273, filed Oct. 2, 2007, which claims priority from Japanese Application Number 2006-278575, filed Oct. 12, 2006, the disclosures of which are hereby incorporated by reference herein in their entirety.

TECHNICAL FIELD

The present invention relates to a front shock absorbing structure of a vehicle (which will be hereinafter referred to as a shock absorbing structure).

BACKGROUND ART

As a shock absorbing structure that is provided in a front portion of a vehicle so as to absorb an impact from ahead, there is a shock absorbing structure in which a shock absorbing member is disposed on a front surface of a rigid bumper reinforcement member so as to extend in a vehicle widthwise direction. The shock absorbing member may have various shapes. For example, Japanese Laid-Open Patent Publication No. 2004-224106 discloses a shock absorbing member (a bumper absorber) having a substantially lain U-shape in cross section. The shock absorbing member collapses when an impact is applied thereto, thereby absorbing the impact. Such a hollow shock absorbing member can absorb the impact more efficiently in comparison with a solid shock absorbing member that is capable of absorbing the impact while it is subjected to compressive deformation. This is because the hollow shock absorbing member may have a smaller amount of uncollapsed portion when the impact is applied thereto.

As another shock absorbing structure having the hollow shock absorbing member, as shown in FIG. 5, there is a shock absorbing structure 80 that has a shock absorbing member 70 having a bent shape in cross section. The shock absorbing member 70 is elongated in a vehicle widthwise direction and has a space 74 that is spread toward a vehicle rearward direction. The shock absorbing member 70 is disposed in a bumper cover 76 so as to be positioned on a front surface of a bumper reinforcement member 72, thereby forming the shock absorbing structure 80. In the shock absorbing structure 80, when an impact P from ahead is applied thereto by an impactor such as a pedestrian, first, as shown in FIG. 6(a), the impact P is received by a bent portion 71 positioned at a front end of the shock absorbing member 70. Next, as shown in FIG. 6(b), the shock absorbing member 70, when applied with the impact P, is moved rearwardly around the bumper reinforcement member 72, so as to be vertically opened thereby. As a result, the bent portion 71 can be broken. Further, as shown in FIG. 6(c), the shock absorbing member 70 can then be collapsed, so that bent portions 71a and 71b applied with the impact P can be relatively displaced rearwardly. Thus, the impact P can be absorbed. Further, as shown in FIG. 7, a load applied to the impactor at the moment, i.e., a value obtained by multiplying (decelerating) acceleration applied to the impactor by mass of the impactor, is relatively increased when the shock absorbing member 70 is broken (FIG. 6(b)), thereby generating a first load peak which is indicated by a reference symbol b in FIG. 7. Further, when the shock absorbing member 70 is completely collapsed and the bent portions 71a and 71b applied with the impact contacts the bumper reinforcement member 72 (FIG. 6(c)), the load becomes relatively further increased, thereby generating a second load peak which is indicated by a reference symbol c in FIG. 7. The shock absorbing member 70 thus constructed may have no uncollapsed portion because it is broken and collapsed. Therefore, the shock absorbing member 70 can be reliably displaced rearwardly, so that the impact can be absorbed.

Generally speaking, in a shock absorbing structure, there is a need to reliably absorb an impact when a vehicle collision happens. In addition, from a viewpoint of protecting an impactor, there is a need to reduce a maximum load applied to the impactor.

SUMMARY OF THE INVENTION

In one aspect of the present invention, a front shock absorbing structure of a vehicle includes a bumper reinforcement member that is disposed in a vehicle width direction in a front portion of a vehicle body and is formed as a rigid elongated member, and a shock absorbing member that is positioned on a front surface of the bumper reinforcement member. The shock absorbing member is vertically divided into a first shock absorbing portion and a second shock absorbing portion. The first and second shock absorbing portions is integrally coupled to each other at a forward side, so as to define a space therebetween at a rearward side. The coupling is formed as an integrally coupled condition that can be broken when an impact is applied by an impactor from ahead. At least one of the first shock absorbing portion and the second shock absorbing portion has a protruding portion that is projected toward the space. When the coupling between the first and second shock absorbing portions is broken by the impact that is applied from ahead by the impactor, the protruding portion contacts the front surface of the bumper reinforcement member before the broken position contacts the same, thereby absorbing the impact.

Thus, the shock absorbing member is vertically divided into a first shock absorbing portion and a second shock absorbing portion. The first and second shock absorbing portions is integrally coupled to each other at a forward side, so as to define a space therebetween at a rearward side. The first and second shock absorbing portions is coupled to each other, so as to be broken when an impact is applied from ahead. Therefore, when the impact is applied from ahead, the impact is applied to the coupling portion positioned in the forward side, so that the coupling portion is broken. As a result, the shock absorbing member can be reliably collapsed. Thus, the coupling portion (broken position) applied with the impact can be relatively displaced rearwardly. Therefore, the impact can be absorbed efficiently.

Further, at least one of the first shock absorbing portion and the second shock absorbing portion has a protruding portion that is projected toward the space. When the coupling between the first and second shock absorbing portions is broken by the impact that is applied to the shock absorbing member from ahead, the protruding portion contacts the front surface of the bumper reinforcement member before the broken position contacts the same. Thus, because the protruding portion contacts the front surface of the bumper reinforcement member before the broken position applied with the impact contacts the same, the broken position can be prevented from idly moving while the impactor is applied with no load. As a result, a reduction of a load applied to the impactor can be minimized.

Further, when the protruding portion contacts the front surface of the bumper reinforcement member, the broken position applied with the impact is maintained in a condition in which a space is reserved behind the same, so as to absorb the impact while flexing. As a result, the load can be prevented from sharply raising. Therefore, a peak of the load applied to the impactor can be lowered. At the same time, the reduction of the load can be eliminated. Thus, a shock absorbing amount can be prevented from reducing.

In one embodiment, the protruding portion may preferably have an angular surface shape or an arcuate shape that is projected toward the space.

Because the protruding portion may preferably have an angular surface shape or an arcuate shape that is projected toward the space, the protruding portion can contact the front surface of the bumper reinforcement member with a substantial contact area. Therefore, the impact can be absorbed while the impactor is applied with a desired load. Further, when the protruding portion contacts the front surface of the bumper reinforcement member, the space can be reliably reserved behind the coupling portion (the broken position), so that the peak of the load applied to the impactor can be reliably lowered. As a result, the load can be changed more gently. Further, the protruding portion can contact the front surface of the bumper reinforcement member with the substantial contact area having the angular surface shape or the arcuate shape. Therefore, if the broken position is vertically displaced, the protruding portion can reliably broadly contact the front surface of the bumper reinforcement member, so that a shock absorbing function can be performed.

EFFECTS OF THE INVENTION

According to the present invention, it is possible to provide a front shock absorbing structure of a vehicle which structure can reduce a maximum load (a peak load) applied to an impactor without substantially reducing a shock absorbing amount.

BRIEF DESCRIPTION OF THE DRAWINGS

FIG. 3 (B) is a view illustrating the shock absorbing process of the shock absorbing structure according to the present embodiment shown in FIG. 2.

FIG. 3 (C) is a view illustrating the shock absorbing process of the shock absorbing structure according to the present embodiment shown in FIG. 2.

FIG. 6 (*b*) is a diagram illustrating the shock absorbing process of the conventional shock absorbing member shown in FIG. 5.

FIG. 6 (*c*) is a diagram illustrating the shock absorbing process of the conventional shock absorbing member shown in FIG. 5.

DETAILED DESCRIPTION OF THE INVENTION

Figure 1:
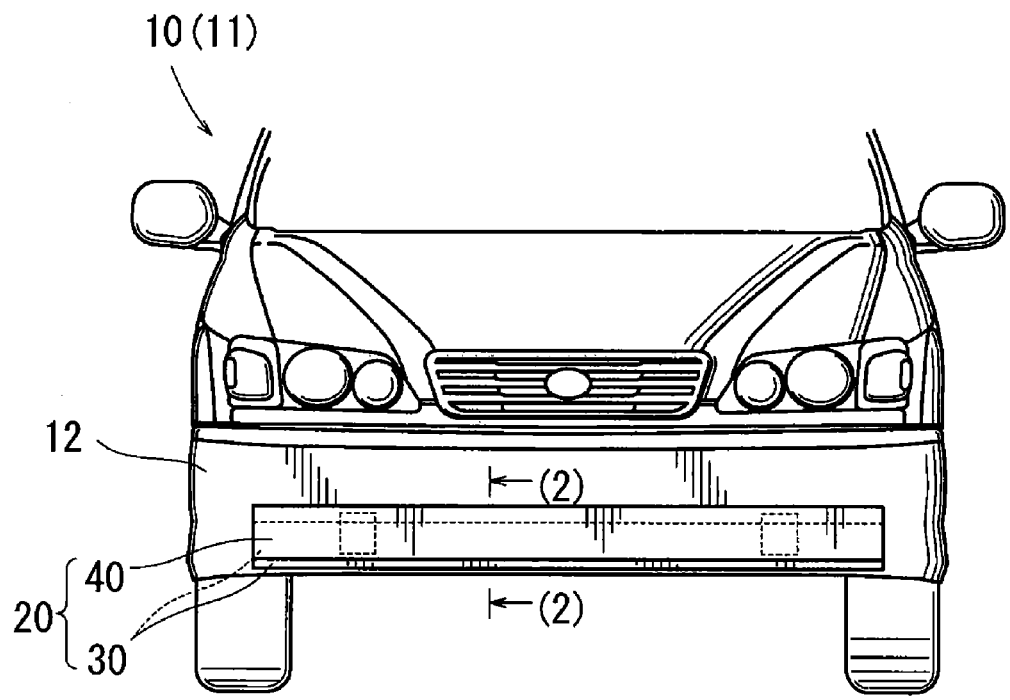
FIG. 1 is a front pictorial view of a vehicle having a shock absorbing structure according to an embodiment of the present invention.

In the following, a best mode for carrying out the present invention is described with reference to the drawings. As shown in FIG. 1, a shock absorbing structure 20 is disposed in a bumper facer 12 in a front portion of a vehicle 10, so as to extend over the substantially entire width thereof. The shock absorbing structure 20 is constructed of a bumper reinforcement member 30 and a shock absorbing member 40 that is disposed on a front surface of the bumper reinforcement member 30.

Figure 2:
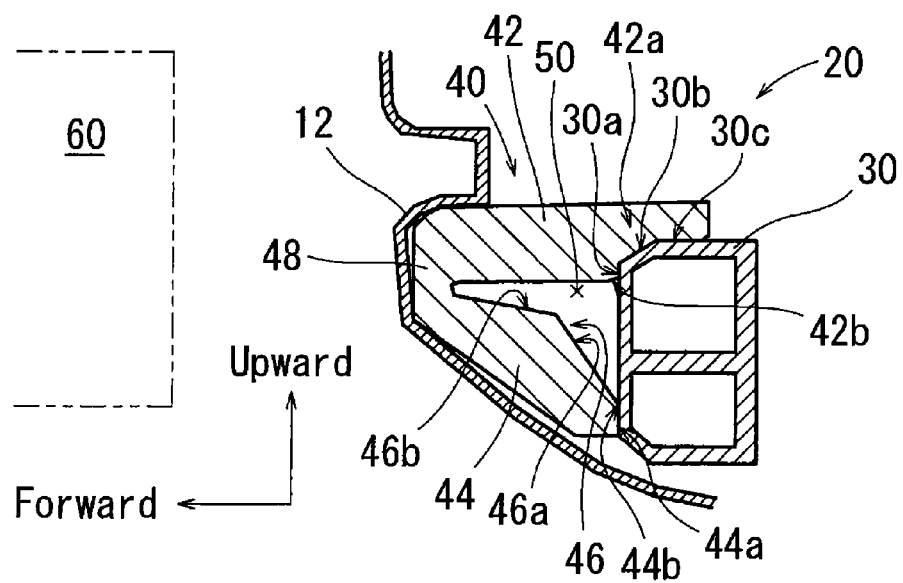
FIG. 2 is a cross-sectional view taken along line (2)-(2) of the vehicle shown in FIG. 1.

The bumper reinforcement member 30 is a rigid body that is disposed in a vehicle widthwise direction in a front portion of a vehicle body 11, so as to function as a framework of the vehicle. As shown in FIG. 2, the bumper reinforcement member 30 has a modified rectangular shape in cross section taken in a longitudinal direction of the vehicle in which front upper and lower corners of the rectangular shape are cut away.

The shock absorbing member 40 is made of foamed resins and is vertically divided into a first shock absorbing portion 42 and a second shock absorbing portion 44. The first and second shock absorbing portions 42 and 44 are integrally coupled to each other at a coupling portion 48 that is positioned at a forward side in the longitudinal direction of the vehicle, so as to define a space 50 that is opened in a rearward side thereof. The first shock absorbing portion 42 positioned in a relatively upper side has a substantially flat plate-shape and extends forwardly substantially horizontally. The first shock absorbing portion 42 has an engagement portion 42*a* and an inclined surface 42*b*. The engagement portion 42*a* is formed by cutting out the first shock absorbing portion 42 at the rearward side thereof, so as to be capable of engaging the upper corner of the bumper reinforcement member 30. The inclined surface 42*b* is inclined rearwardly and upwardly toward the engagement portion 42*a* and is continuous with the engagement portion 42*a*. The second shock absorbing portion 44 positioned in a relatively lower side has an outer wall surface and an inner wall surface. The outer wall surface is inclined rearwardly and downwardly with respect to the first shock absorbing portion 42. The inner wall surface includes a first inner wall surface 46*a* relatively rearwardly positioned and a second inner wall surface 46*b* relatively forwardly positioned. The two surfaces 46*a* and 46*b* have different inclination angles and are continuous with each other. Further, the two surfaces 46*a* and 46*b* define a protruding portion 46 that is projected toward the space 50. The first shock absorbing portion 42 and the second shock absorbing portion 44 are integrally coupled together. However, the coupling portion 48 can be broken when the first shock absorbing portion 42 and the second shock absorbing portion 44 are separated from each other. The protruding portion 46 formed in the second shock absorbing portion 44 is positioned at a rightward side (a rearward side) of the coupling portion 48 of the first shock absorbing portion 42 and the second shock absorbing portion 44 as seen in FIG. 2. Therefore, when the coupling portion 48 is broken by an impact applied from ahead, the protruding portion 46 contacts the front surface of the bumper reinforcement member 30 before the coupling portion 48 contacts the same. At the upper corner of the bumper reinforcement member 30, the engagement portion 42*a* of the first shock absorbing portion 42 contacts a front wall 30*a*, an inclined wall 30*b* and an upper wall 30*c*, thereby engaging thereto. At the same time, a rear end surface 44*a* of the second shock absorbing portion 44 contacts a lower portion of the front surface of the bumper reinforcement member 30. Thus, the shock absorbing member 40 is positioned at the front surface of the bumper reinforcement member 30.

Figures 3A, 3B:
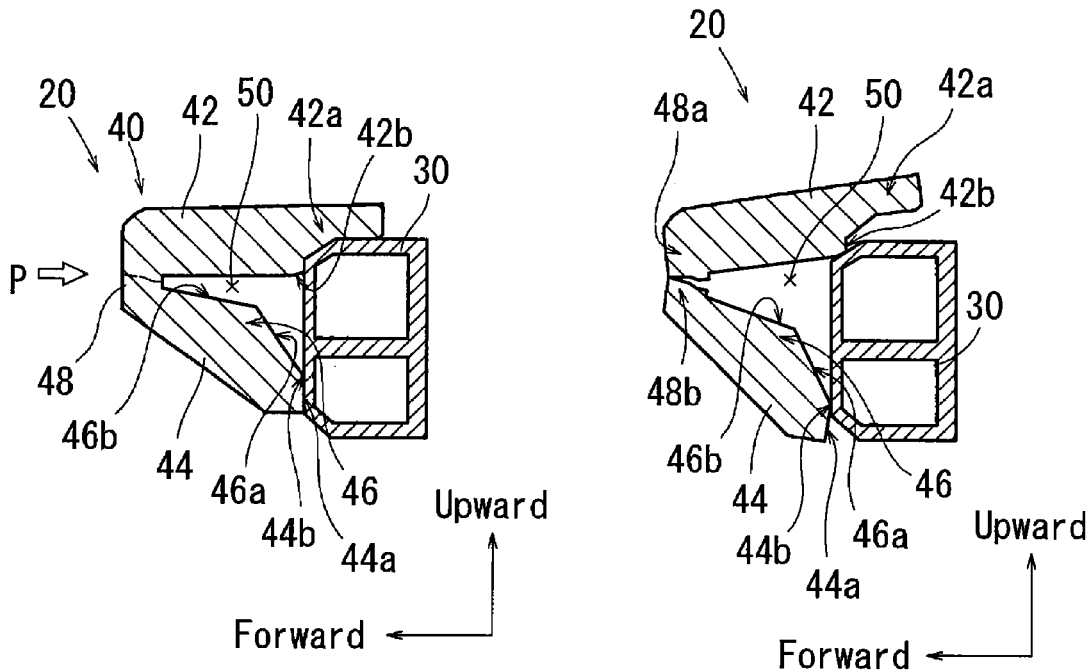
FIG. 3 (A) is a view illustrating a shock absorbing process of the shock absorbing structure according to the present embodiment shown in FIG. 2.
Figure 3C:
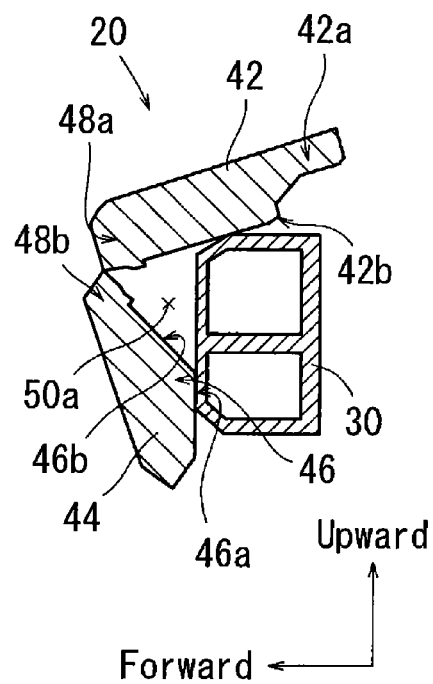
Figure 4:
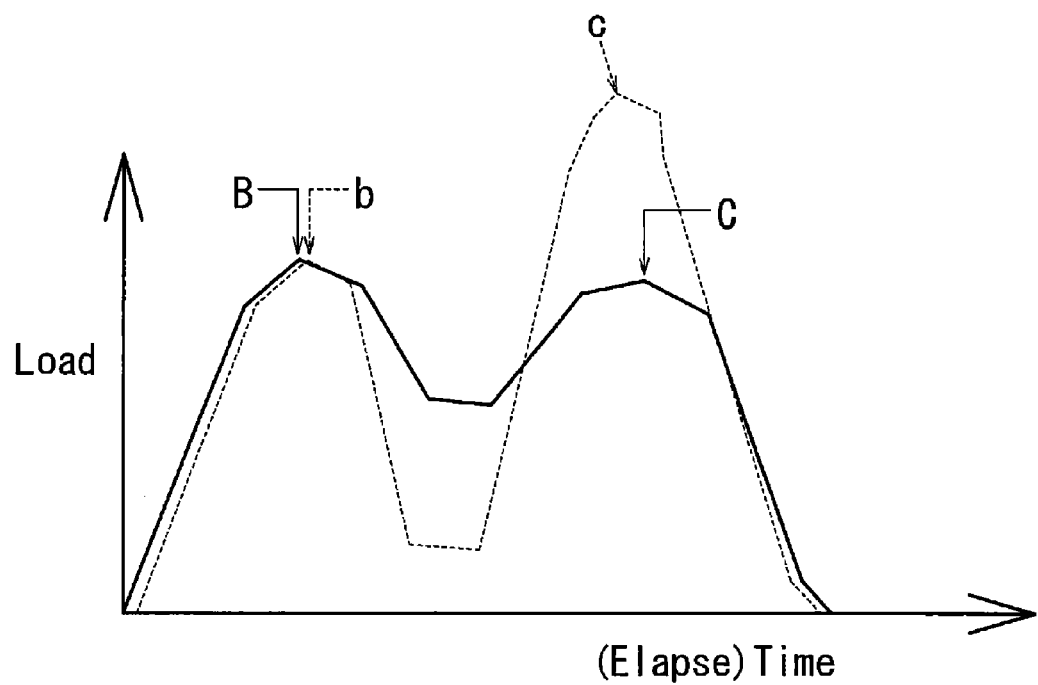
FIG. 4 is a graph illustrating a relation between a load applied to an impactor and time in the shock absorbing process of the shock absorbing structure according to the present embodiment shown in FIGS. 3(A) to 3(C).
Figure 5:
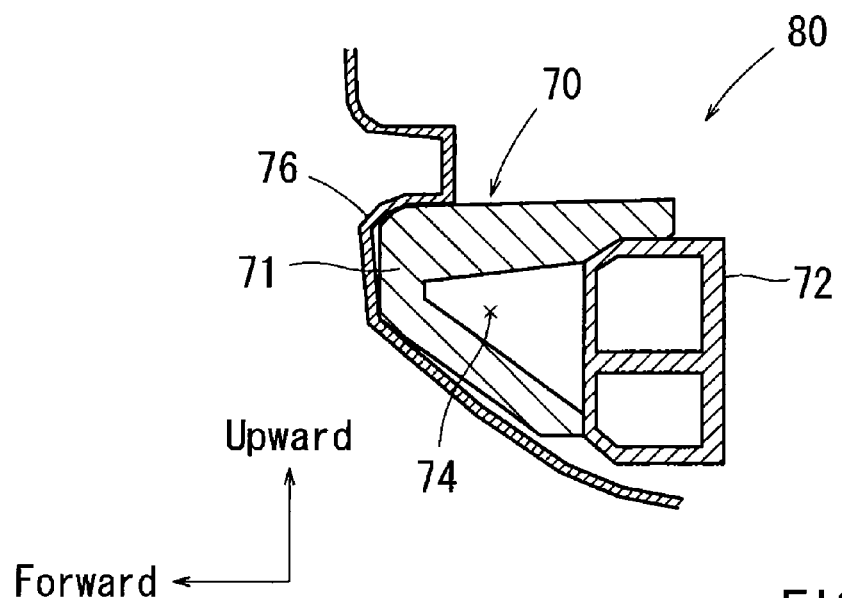
FIG. 5 is a cross-sectional view of a front portion of the vehicle having a conventional shock absorbing member, which view is taken in a longitudinal direction of the vehicle.
Figure 6A:
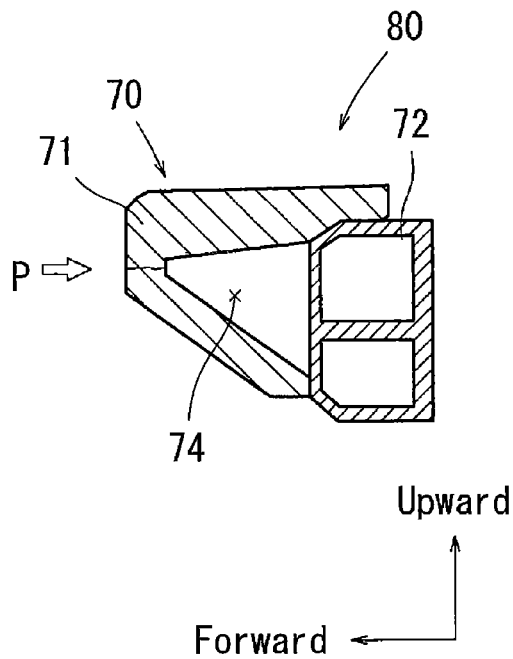
FIG. 6(*a*) is a diagram illustrating a shock absorbing process of the conventional shock absorbing member shown in FIG. 5.
Figure 6B:
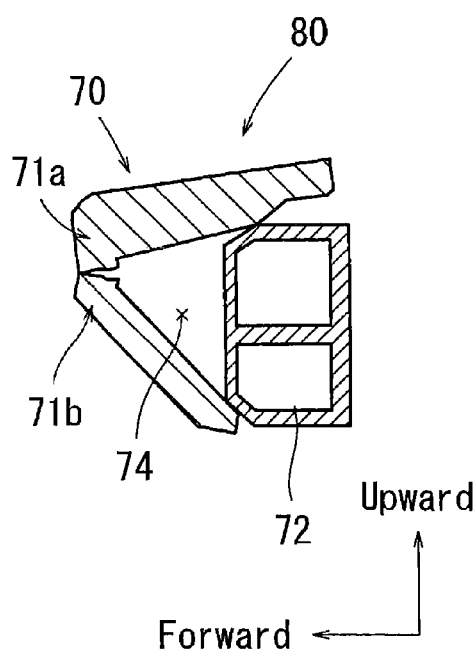
Figure 6C:
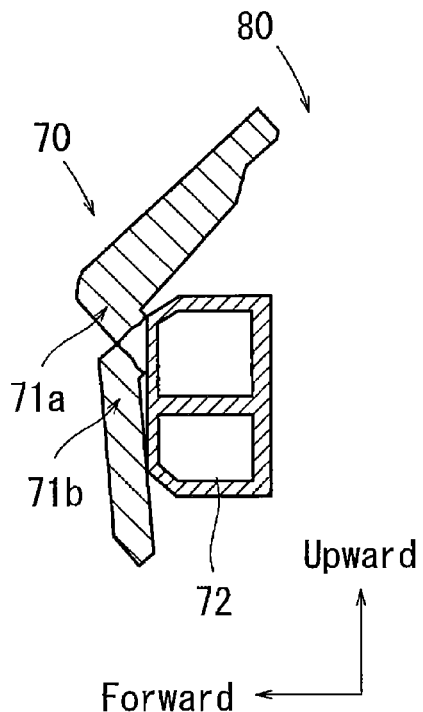
Figure 7:
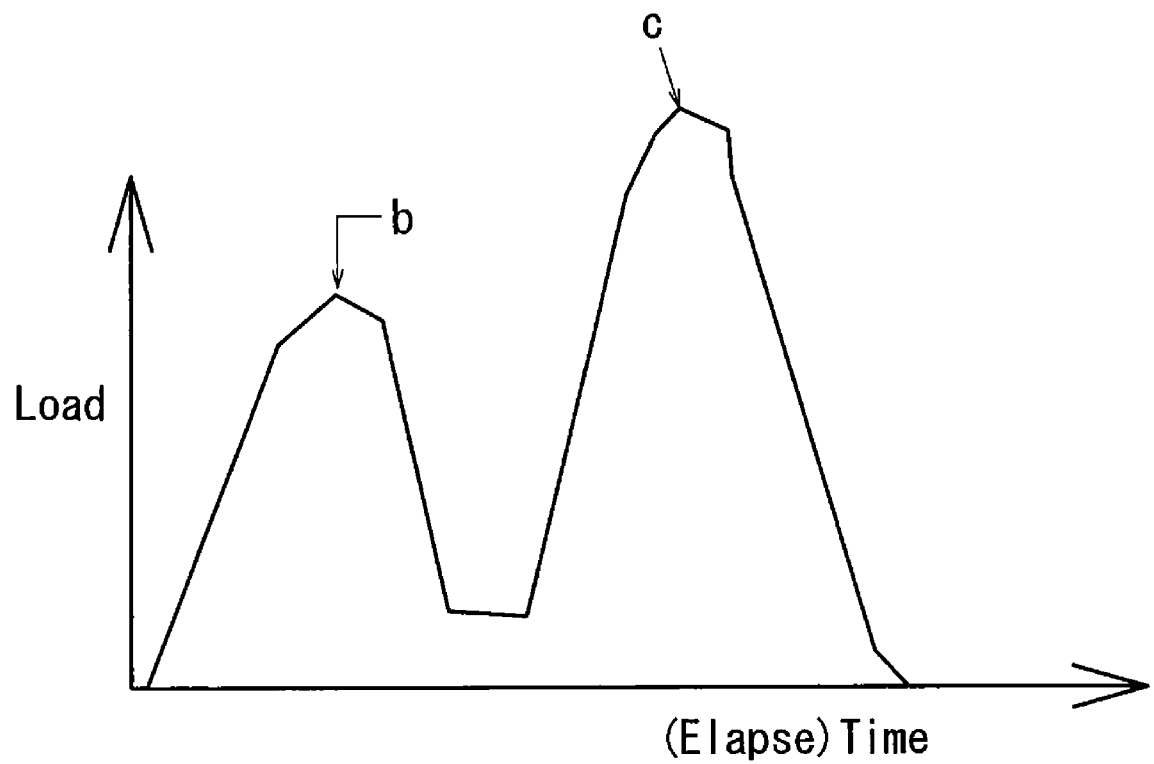
FIG. 7 is a graph illustrating the relationship between a load applied to an impactor and time in the shock absorbing process of a conventional shock absorbing structure shown in FIGS. 6(*a*) to 6(*c*).

The shock absorbing structure 20, when applied with an impact by an impactor 60 from ahead, can change in form as shown in FIGS. 3(A) to 3(C), thereby absorbing the impact (a collision load) P. A relation between a load applied to the impactor 60 at the moment and time is shown by a graph that is shown by solid line in FIG. 4. Further, in FIG. 4, a relation between a load and time in the conventional shock absorbing structure 80 is shown by broken line. Further, in the present invention, "the load applied to the impactor" means a value obtained by multiplying (decelerating) acceleration applied to the impactor 60, e.g. at the time of a vehicle collision, by mass of the impactor 60, which may be hereinafter simply referred to as a load. As shown in FIG. 3(A), when the impact P is applied by the impactor 60 (not shown therein) from ahead, the shock absorbing member 40 first receives the impact P at the coupling portion 48 that is positioned in the forward side. When the impact P is applied from ahead, the engagement portion 42*a* is disengaged, so that the first shock absorbing portion 42 is forced to be displaced rearwardly. Conversely, the second shock absorbing portion 44 is forced to be displaced downwardly while rotating on the front surface of the bumper reinforcement member 30. As a result, as shown in FIG. 3(B), the space 50 is spread by the bumper reinforcement member 30, so that the first shock absorbing portion 42 and the second shock absorbing portion 44 are spaced from each other. Thus, the coupling portion 48 is broken. At this time, the load applied to the impactor 60 may gradually increase and upon breakage, the load may generate a first load peak which is indicated by a reference symbol B in FIG. 4.

When the first shock absorbing portion 42 and the second shock absorbing portion 44 are broken, the first shock absorbing portion 42 is displaced rearwardly. At the same time, the second shock absorbing portion 44 is further displaced while rotating. As a result, broken positions (broken coupling portion) 48*a* and 48*b* applied with the impact P are relatively moved rearwardly, so that the impact P can be absorbed. At this time, the second shock absorbing portion 44 contacts the front surface of the bumper reinforcement member 30 and is displaced downwardly while rotating about an angled portion (which will be hereinafter referred to as a contact angled portion) 46*a* that is defined between the rear end surface 44*a* and the first inner wall surface 46*a*. As a result, the broken positions 48*a* and 48*b* are moved rearwardly while the contact angled portion 46*a* is subjected to compressive deformation, so that the impact P is absorbed. Because the impact P is absorbed while the contact angled portion 46*a* is subjected to compressive deformation, the load applied to the impactor 60 can be relatively somewhat reduced.

As shown in FIG. 3(C), the second shock absorbing portion 44 is further rotated and displaced and the first inner wall surface 46*a* defining the protruding portion 46 contacts the front surface of the bumper reinforcement member 30. When the first inner wall surface 46*a* contacts the front surface of the bumper reinforcement member 30, the second shock absorbing portion 44 is subjected to compressive deformation while it is rearwardly flexed, so as to absorb the impact P. At this time, the load can be relatively somewhat increased and the impact P is absorbed while generating a second load peak which is indicated by reference symbol C in FIG. 4.

The shock absorbing structure 20 constructed as described above may provide following effects.

First, because the second shock absorbing portion 44 has the protruding portion 46 that is projected toward the space 50, the first inner wall surface 46*a* first contacts the bumper reinforcement member 30 before the broken positions 48*a* and 48*b* applied with the impact P directly contacts the bumper reinforcement member 30. At this time, although the first inner wall surface 46*a* contacts the bumper reinforcement member 30, the broken positions 48*a* and 48*b* are maintained in a condition in which a space 50*a* is formed behind the same. Therefore, the second shock absorbing portion 44 is not only subjected to compressive deformation but also absorbs the impact while it is flexed rearwardly. As a result, the load applied to the impactor 60 can be prevented from sharply raising, so that the second load peak indicated by reference symbol C in FIG. 4 can be reduced so as to be lower than that of the prior art (which is indicated by reference symbol c in FIG. 4). That is, a maximum load applied to the impactor 60 can be reduced, so that the load can be changed gently.

Next, the protruding portion 46 has an angled surface shape that is defined by the two surfaces of the first inner wall surface 46*a* and the second inner wall surface 46*b*. Further, the angled portion (the contact angled portion 44*b*) is defined between the rear end surface 44*a* and the inner wall surface 46*a*. Because the angled portion (the contact angled portion 44*b*) is subjected to compressive deformation, even in a period between the time the coupling portion 48 is broken and the time the first inner wall surface 46*a* contacts the bumper reinforcement member 30, the impact can be absorbed while the impactor 60 is applied with a desired load. As a result, while the load applied to the impactor 60 can be reduced, the load can be reduced more gently than in the prior art. Therefore, a reduction of a shock absorbing amount, i.e., shock absorbing performance, caused by a reduction of the load can be prevented, so as to obtain a desired shock absorbing amount.

Further, the first shock absorbing portion 42 engages the upper corner of the bumper reinforcement member 30 while the engagement portion 42*a* contacts the front wall 30*a* of the bumper reinforcement member 30. Therefore, the shock absorbing structure 20 can be reliably positioned in the front surface of the bumper reinforcement member 30, so as to be prevented from moving rearwardly in a normal condition. However, because the inclined surface 42*b* is formed so as to be continuous with the engagement portion 42*a*, when the first shock absorbing portion 42 is applied with the impact P greater than a predetermined value from ahead, the first shock absorbing portion 42 can be smoothly disengaged, so as to be smoothly moved rearwardly. Thus, the shock absorbing structure, when applied with the impact P, can smoothly start to absorb the impact P. Further, because the shock absorbing structure can be reliably positioned in the forward side in the normal condition, a sufficient displacement distance can be reserved, so that the impact can be effectively absorbed.

The shock absorbing structure of the present invention is not limited to the embodiment described above. In the embodiment described above, the protruding portion 46 is formed in the second shock absorbing portion 44 that is positioned in the relatively lower side. However, it is not limited to this structure. The protruding portion 46 can be formed in the first shock absorbing portion that is positioned in the upper side. Also, two protruding portions can be formed in both of the first and second shock absorbing portions that are positioned in the upper and lower sides.

Further, the shape of the protruding portion is not limited to the embodiment described above. The shape of the protruding portion may be an angled surface shape defined by three or more surfaces or an arcuate shape. That is, the shape of the protruding portion can be changed according to a required shock absorbing property (performance) of the vehicle. From a viewpoint of moldability, the angled surface shape in the embodiment described above is advantageous. Conversely, in order to obtain a gentle shock absorbing property, the arcuate shape is preferred. Thus, the shape of the protruding portion can be determined comprehensively from viewpoints of the required shock absorbing property, the moldability or other such factors.

Materials of the shock absorbing member are not limited to special materials. The foamed resins such as hard urethane foam and foamed polypropylene are lightweight. Further, the foamed resins can be subjected to compressive deformation to absorb the impact even when the broken positions applied with the impact finally contact the bumper reinforcement member.

The invention claimed is:

1. A front shock absorbing structure of a vehicle, comprising:
 a bumper reinforcement member that is disposed in a vehicle width direction in a front portion of a vehicle body and is formed as a rigid elongated member; and
 a solid shock absorbing member that is disposed on a front surface of the bumper reinforcement member,
 wherein the solid shock absorbing member is vertically divided into a first shock absorbing portion and a second shock absorbing portion, the first and second shock absorbing portions being integrally coupled to each other at a forward side, so as to define a space therebetween at a rearward side, and the coupling being formed as an integrally coupled condition that can be broken when an impact is applied to the solid shock absorbing member from the front of the vehicle,
 wherein at least one of the first shock absorbing portion and the second shock absorbing portion has a protruding portion that is projected toward the space, and
 wherein when the coupling between the first and second shock absorbing portions is separated by the impact that is applied to the solid shock absorbing member from the front of the vehicle, the protruding portion contacts the front surface of the bumper reinforcement member before a separated portion of the coupling contacts the same, thereby absorbing the impact.

2. The front shock absorbing structure of a vehicle as defined in claim 1, wherein the protruding portion has an angular surface shape that is projected toward the space.

* * * * *